United States Patent [19]
Malric et al.

[11] Patent Number: 5,314,755
[45] Date of Patent: May 24, 1994

[54] METHOD TO REDUCE SCALING DUE TO FREEZING AND THAWING IN CONCRETE

[75] Inventors: Bernard Malric, Hudson; Réjean Beaudoin; Chantal Berthelot, both of Vaudreuil, all of Canada

[73] Assignee: Domtar, Inc., Montreal, Canada

[21] Appl. No.: 962,044

[22] Filed: Oct. 15, 1992

Related U.S. Application Data

[63] Continuation of Ser. No. 655,793, Feb. 14, 1991, abandoned.

[51] Int. Cl.$^5$ .......................... C09K 3/18; C09K 9/02; B32B 9/00
[52] U.S. Cl. .................... 428/540; 428/703; 427/427; 252/70; 252/382; 106/13; 106/14.12; 106/664; 106/713
[58] Field of Search ...................... 106/13, 14.12, 637, 106/713, 664; 252/70, 389.2, 387; 427/427; 428/540, 703

[56] References Cited

U.S. PATENT DOCUMENTS 4,613,450  9/1986  Moran et al. .................. 252/181

FOREIGN PATENT DOCUMENTS 0096619  12/1983  European Pat. Off. .
0253357  1/1988   European Pat. Off. .
0288812  11/1988  European Pat. Off. .
0322183  6/1989   European Pat. Off. .
60-05056  1/1985  Japan .

OTHER PUBLICATIONS

Chemical Abstracts vol. 102, 1985, p. 308, Abstract 102:189922r (JP60 05,056).

Primary Examiner—C. Warren Ivy
Assistant Examiner—Raymond Covington
Attorney, Agent, or Firm—Bachman & LaPointe

[57] ABSTRACT

A concrete surface having at least a residual amount of sodium fluorophosphate. A method to reduce scaling due to freezing and thawing is also disclosed. The method comprises contacting the surface of a concrete with a system containing at least sodium fluorophosphate. The sodium fluorophosphate closes the pores to water and other foreign matter.

21 Claims, 2 Drawing Sheets

METHOD TO REDUCE SCALING DUE TO FREEZING AND THAWING IN CONCRETE

This is a continuation of co-pending application Ser. No. 655,793 filed on Feb. 14, 1991 now abandoned.

BACKGROUND OF THE INVENTION

FIELD OF THE INVENTION

This invention relates to a method to reduce scaling due to freezing and thawing of concrete, particularly when a deicer is used to deice the surface of a concrete, such as sodium chloride. By the term "concrete", throughout the disclosure and claims, it is meant a concrete, particularly a surface made up of concrete, as opposed to reinforced concrete containing rebars, which is disclaimed from the present definition of concrete as used throughout the disclosure and claims.

DESCRIPTION OF RELATED ART

Applicant has filed a U.S. continuation-in art application, Ser. No. 282,641 filed Dec. 12, 1988, now U.S. Pat. No. 5,071,579 directed to a corrosion inhibiting system product containing a residual amount of such system and method therefor, wherein sodium fluorophosphate, also known as "sodium monofluorophosphate" and abbreviated as "MFP", is used in order to prevent corrosion of reinforced concrete containing rebars, the said rebars thus exhibiting a reduced tendency to corrode.

SUMMARY OF THE INVENTION

Broadly stated, the invention is directed to a method to reduce scaling due to freezing and thawing, comprising contacting a concrete, with a system containing at least sodium fluorophosphate.

Said contacting may be made by numerous means, such as, but not limited thereto: laying, spraying, brushing, rolling, painting, soaking, immersing, impregnating, powdering or by raising a dike or a dam around a concrete to treat a slab of concrete with a solution of MFP, and by any other means of contacting sodium fluorophosphate with a concrete surface.

The invention is also directed to concrete having at least a residual amount of sodium fluorophosphate.

The invention is preferably directed to a method of spraying concrete with an aqueous solution of sodium fluorophosphate.

More preferably, the concrete is dried before treating it with a system containing an aqueous sodium fluorophosphate.

The invention is also directed to a method as defined above, when deicers are needed, wherein said system may include deicers, and particularly sodium chloride.

The word "system" is meant to include solvents, deicers, carriers, that may be used with sodium fluorophosphate in the treatment of concrete.

BRIEF DESCRIPTION OF DRAWINGS

In the drawings which illustrate a particular embodiment of the invention.

DESCRIPTION OF PREFERRED EMBODIMENT

Examples

Figure 1:
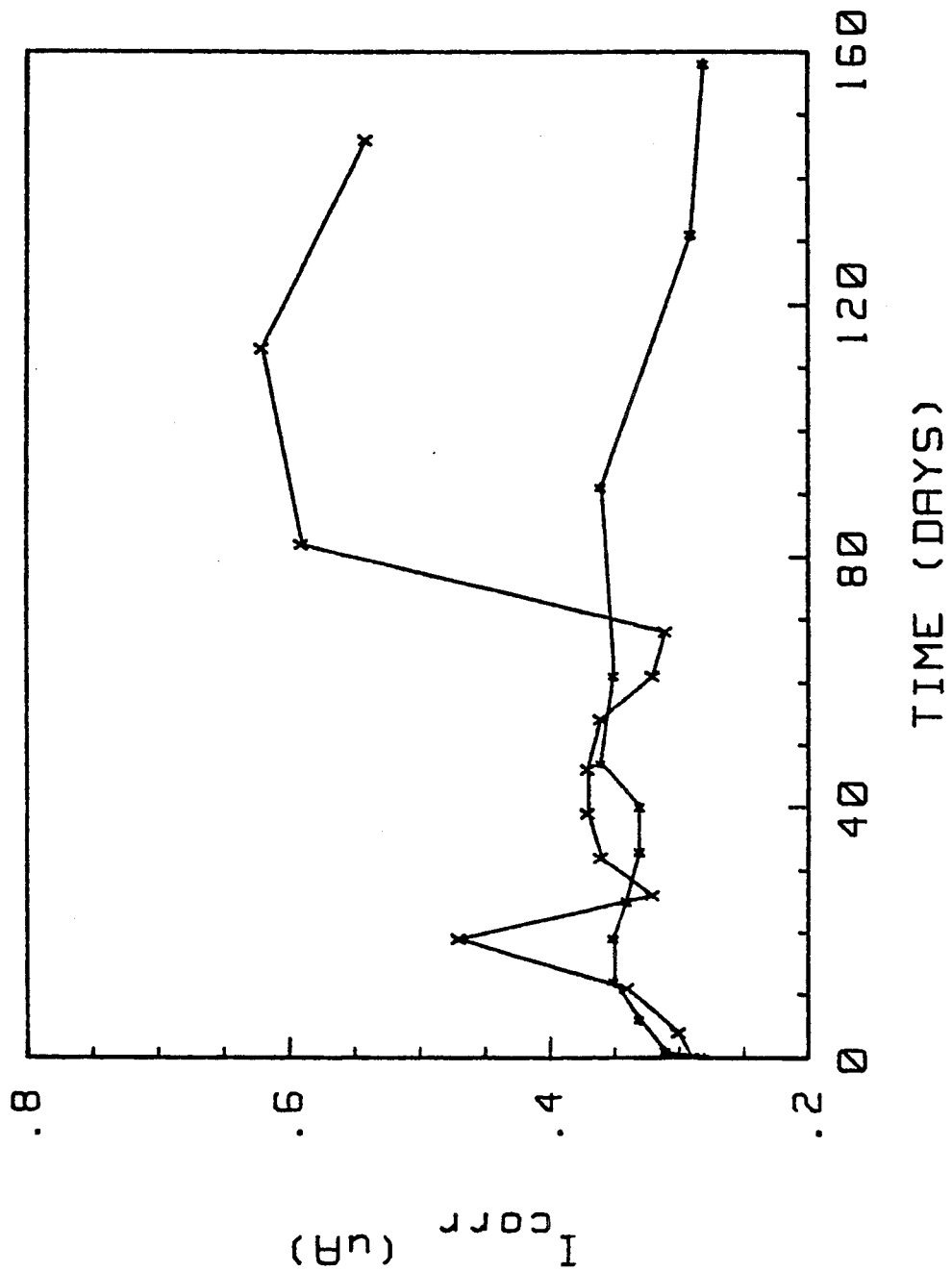
FIG. 1 is the average current generated by the action of the chloride ions on the metal in the Portland cement concrete, acting as an electrolytic cell in the presence of chloride as obtained from Example 7, wherein the abscissa represents the number (n) of days since the beginning of the experiment and the ordinate represents the corresponding current in microamperes per square centimeter($uA/cm^2$), as measured that day for a MFP treated and an untreated Portland cement concrete, FIG. 2 along the abscissa represents the number of days shown in FIG. 1 and along the ordinate, the difference in potential in milivolts as compared to a saturated calomel electrode.

The following examples will now serve to illustrate the invention.

Examples 1-6

The cubes

Concrete cubes or blocks were made by mixing one part of Portland cement concrete (ACNOR type 10 or ASTM type 1, a general use cement), 0.52 part of water, 2.25 parts of sand and 2.75 parts of aggregates having a particle size between 4 and 20 mesh, said parts being parts by weight.

The size distribution of the aggregates were as shown in Table I.

TABLE I

| Aggregate size distribution (mesh) | Partition (%) |
|---|---|
| 4-6 | 30 |
| 6-8 | 25 |
| 8-12 | 20 |
| 12-16 | 15 |
| 16-20 | 10 |

The concrete is cast into cubes, and covered with plastic for 3 days, then cured for 28 days in distilled water.

The concrete cubes were then allowed to dry for a period of 24 hours: at room temperature for Examples 1 to 4, Table II; for Examples 5 and 6, Table III, the cubes were dried at elevated temperature by placing them in an oven at 50° C.

The cubes were then treated as follows:

TREATMENT WITH THE SCALING INHIBITOR

The cubes were immersed in sodium monofluorophosphate aqueous solution for a period of 4 hours, in order to allow for penetration of the solution into concrete cubes. This treatment is defined herein throughout the disclosure and claims as a "MFP treatment cycle". The cubes were weighed before and after treatment. Before any other cycle, the cubes were left at room temperature for 24 hours.

FREEZE-THAW DETERMINATION

In order to determine the freeze-thaw characteristics of each cube, the following procedure was followed:

The cubes, treated or not with sodium monofluorophosphate, were washed with water and allowed to dry on a board for 3 days or until their weight was constant. They were then placed in a recipient containing a cellulose sponge. A 4% aqueous NaCl solution was added to half the height of the sponge. The recipient was then tightly closed during the freeze-thaw cycles. The recipient was placed in a freezer during 16 to 18 hours at −10° C.

The recipient was then kept at room temperature during 6 to 8 hours so that a "freeze-thaw cycle" was a day. Test of 5 to 7 freeze-thaw cycles were conducted:

the number of cycles was determined by a visual examination of the cubes i.e. until in appearance a certain amount had disappeared. The cubes were then washed with distilled water and dried for 24 hours to measure the weight loss and average the cube weight loss.

Table II illustrates the effect of sodium monofluorophosphate treatment on concrete blocks after treatment and drying at room temperature (R.T.) during a day.

TABLE II

| Example No.: | Scaling of concretes, dryed at R.T. and then treated with MFP | | | | |
|---|---|---|---|---|---|
| | Sample A | 1 | 2 | 3 | 4 |
| MFP treatment (cycle(s) × concentration) | None | 1 × 5% | 1 × 20% | 3 × 20% | 5 × 20% |
| % of MFP retained, as determined by weight gain | 0 | | 0.4 | 1.5 | 3.7 |
| FREEZE-THAW TEST IN 4% NaCl SOLUTION Weight loss (%) | 32 | 12 | 10 | 7 | 0 |

As is easily seen, cubes not treated as shown in sample A lost 32% weight during about a week treatment while in example 1, which had been treated on one occasion, a 12% loss had occurred.

In example 2, where cubes had been treated with & one cycle at 20% MFP, only 10% average loss had occurred.

In example 3, where blocks had been treated with 3 cycles of 20% MFP each cycle, a 7% average loss in weight of the cubes had occurred.

In example 4, where a block had been treated with 5 cycles, at 20% MFP each cycle, the blocks of cement lost no weight.

As a tentative explanation, this suggests that MFP is sealing the pores of concrete.

Examples 5 and 6

The MFP has a greater synergistic effect on concrete, when the concrete is dried, as is evident from Table III, where the drying was conducted at 50° C. and all other conditions remaining the same as in Examples 2 and 4, except that for the freeze-thaw determination, a portion of the cubes were treated in water and another portion in 4% NaCl solution.

Table III illustrates that the freeze-thaw test showed absolutely no deterioration in water, proving that MFP has no negative effect on the resistance of concrete to freeze-thaw scaling.

Furthermore, even cement blocks treated with only one cycle of MFP at a concentration of 20% yield no weight loss. Also the MFP concentration retained in the concrete, as determined by weight gain, is higher. As is shown from this table, dried concrete absorbs a larger amount of MFP solution. The concrete, dried at this higher temperature, absorbs about 30% more MFP, as is shown in Table III.

TABLE III

| | Scaling of concrete, dryed at 50° C. and treated with MFP | |
|---|---|---|
| Example No. | 5 | 6 |
| MFP TREATMENT (cycle(s) × concentration) | 1 × 20% | 5 × 20% |
| % of MFP retained as determined by weight gain | 0.5 | 5.9 |
| Freeze-thaw test in water (weight loss %) | 0 | 0 |
| Freeze-thaw test in 4% NaCl solution (weight loss in %) | 0 | 0 |

The tables II and III clearly evidence that the higher the MFP concentration in the concrete, the higher is the resistance to freeze-thaw scaling, if one compares the weight gain indicative of the % MFP retained versus the weight loss.

Also, if one compares Table II against Table III, the weight gain which is the MFP retained, for a given concentration and cycle is higher when a concrete is dried at a higher temperature, giving a clear indication that the concrete acts as a sponge, drawing a greater amount of MFP solution when it is dry.

It also clearly indicates that the contacting of the sodium fluorophosphate should preferably be conducted immediately following setting of said concrete in order to prevent any scaling.

Example 7

In Example 7, measurements were made of the permeability of Portland cement concrete untreated versus the permeability of the Portland cement concrete treated with sodium fluorophosphate, other conditions remaining the same.

Specimens consisting of a steel bar embedded in concrete were treated with MFP or not treated with MFP.

Treatment With MFP

The treatment of MFP consisted in drying a specimen for 2 days at 50° C., then soaking in a 20% MFP aqueous solution for 4 hours. The specimen was then left at room temperature for one day.

This above treatment was then repeated 5 times.

Measurement of permeability

All the specimens treated or not treated were immersed in a 3% aqueous sodium chloride solution to about one half of their height, during the whole experiment. The corrosion current and the half-cell potential were measured at regular intervals during the experiment.

Results

Figure 2:
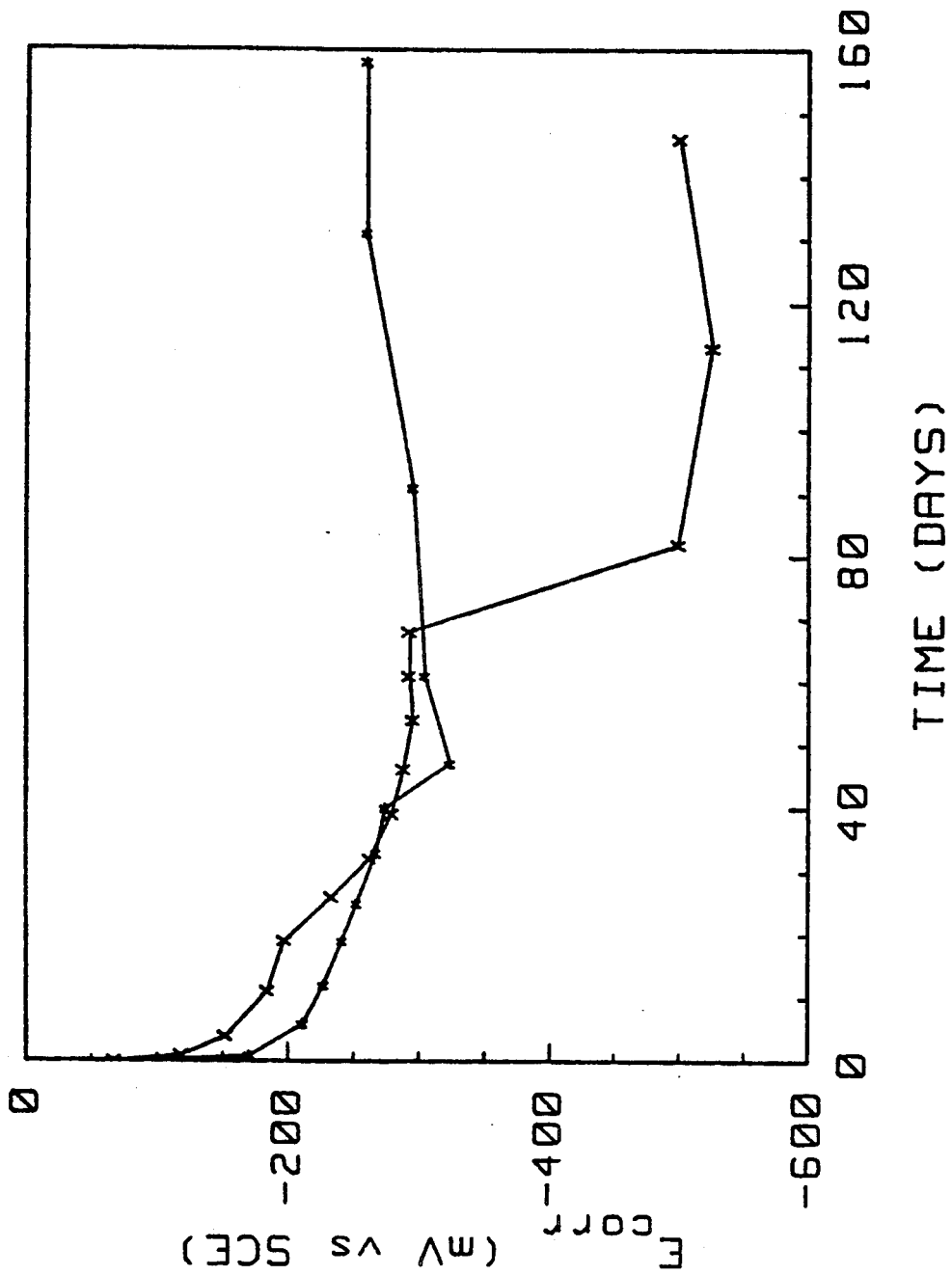

Shown in Table IV and derived therefrom, FIGS. 1 and 2, are the measurements obtained for the Portland cement concrete untreated (graphs A and C) and from Portland cement concrete treated with the sodium fluorophosphate (graphs B and D). After just a few days, the untreated Portland cement has a gradually increasing electrical activity due to the pores creating a permeability for chlorine ion, while already within 2 days the Portland cement treated with sodium monofluorophosphate does not show a comparable activity. This clearly indicates that the pores of the cement, to a substantially large extent, have been closed to chlorine ions and that this action is maintained and even increased along an extended period. This also explains why the cement treated with sodium monofluorophosphate does not have a tendency for freeze-thaw scaling, since the water no available pores or a reduced number of pores, to enter the concrete. Thus MFP closes the pores to water and other foreign matter.

According to ASTM-C-876-80, up to about 300 millivolts, the chloride is rather passive but above −450 to −500 mV, the metal is very active. This method also enables the determination of the speed or rate of penetration of sodium chloride salt in a concrete.

TABLE IV

| Untreated cement | | | Treated cement | | |
|---|---|---|---|---|---|
| n day | (uA/cm$^2$) | (mV) | n day | (uA/cm$^2$) | (mV) |
| 0 | .29 | −68 | 0 | .28 | −65 |
| 1 | | −119 | | | |
| 4 | .3 | −153 | 1 | .31 | −171 |
| 11 | .34 | −185 | 6 | .33 | −212 |
| 19 | .47 | −198 | 12 | .35 | −228 |
| 26 | .32 | −234 | 19 | .35 | −242 |
| 32 | .36 | −263 | 25 | .34 | −253 |
| 39 | .37 | −280 | 33 | .33 | −268 |
| 46 | .37 | −289 | 40 | .33 | −275 |
| 54 | .36 | −296 | 47 | .36 | −324 |
| 61 | .32 | −293 | 61 | .35 | −305 |
| 68 | .31 | −293 | 91 | .36 | −296 |
| 82 | .59 | −500 | 131 | .29 | −260 |
| 113 | .62 | −526 | 158 | .28 | −260 |
| 146 | .54 | −501 | | | |

Examples 8-10

The following 3 examples illustrate the effect of the concentration of MFP and its sealing effect on concrete to reduce its porosity or permeability.

In order to determine and to prove that the MFP had the property of sealing the pores in a concrete, tests were conducted according to AASHTO T277-831 of the American Association of State Highway Transportation Officials, wherein a 3-portion cell provided with electrodes is used: the middle portion being concrete and dividing the two other portions, a first one containing sodium hydroxide and a third one, sodium chloride. In this cell, the chlorine ion according to the porosity of the concrete, is displaceable from the first portion through the concrete to reach the sodium hydroxide in the third portion, the cell thereby producing a measurable current.

More particularly this method is a standard for the determination of the permeability of Portland cement, determines the ease for the chloride ions to penetrate the cement. It consists in monitoring the electrical current passing through a long core of cement containing a metal immersed in a sodium chloride solution, a potential difference of 60 volts being maintained during 6 hours. The total charge pass is measured in Coulombs and is directly related to the permeability of the cement, as measured by the permeability of the cement to chloride ions.

Following the AASHTO P-277831 procedure cells were made using, for Example 8, 3% of an aqueous solution of solids, said solid being 98.75% sodium chloride and 1.25% MFP; in Example 9, 97.5% sodium chloride and 2.5% MFP; and in Example 10, 95% sodium chloride and 5% MFP. Similar electrodes were used without MFP, that is simply with 3% sodium chloride or a 3% solid solution containing 100% sodium chloride.

TABLE V

| Example No. | 8 | 9 | 10 |
|---|---|---|---|
| Coulombs obtained from cells having 3% sodium chloride alone, all other conditions remaining the same | 4890 | 5680 | 4930 |
| Coulombs obtained with MFP treated concrete | 3490 | 2380 | 1360 |
| Reduction in activity due to sealing of concrete | 29% | 58% | 72% |

As shown in Table V, the reduction in chloride activity is directly proportional to the amount of MFP that was present in the solution ranging from an inhibition of from 29 to 72% activity. Thus, it is clearly shown that the permeability of the concrete is directly related to the amount of MFP used.

Although the present invention has been explained hereinabove by way of preferred embodiments thereof, it should be pointed out that any modifications to these preferred embodiments, within the scope of the appended claims, is not deemed to change or alter the nature and scope of the invention.

What is claimed is:

1. A method for reducing scaling on a concrete surface due to freezing and thawing, comprising:
   contacting a surface of said concrete with a system containing at least sodium fluorophosphate.

2. A method as defined in claim 1, wherein said system is sodium fluorophosphate.

3. A method as defined in claim 1 wherein said system comprises said sodium fluorophosphate dissolved in an aqueous medium.

4. A method as defined in claim 3, which includes before contacting of said concrete with said system, drying said concrete to increase the capacity of said concrete to receive said sodium fluorophosphate.

5. A method as defined in claim 3, wherein said solution contains from 0.5 to 20%, by weight, sodium monofluorophosphate.

6. A method as defined in claim 3, wherein said solution contains up to 20%, by weight, sodium monofluorophosphate.

7. A method as defined in claim 1, wherein said system comprises a deicer and said sodium fluorophosphate.

8. A method as defined in claim 1, wherein said system comprises sodium chloride and sodium fluorophosphate.

9. A method as defined in claim 1, wherein said contacting comprises spraying and said system is an aqueous solution of sodium fluorophosphate.

10. A method as defined in claim 1, wherein said contacting comprises soaking and said system is an aqueous solution of sodium fluorophosphate.

11. A concrete surface having at least a residual amount of sodium fluorophosphate, as obtained by the method of claim 1, wherein said sodium fluorophosphate seals the concrete, closing pores within said concrete.

12. A method as defined in claim 1, wherein said contacting is made immediately following setting of said concrete.

13. A method as defined in claim 1, wherein said sodium fluorophosphate is sprayed on said concrete.

14. A method as defined in claim 1, wherein said sodium fluorophosphate is brushed on said concrete.

15. A method as defined in claim 1, wherein said concrete is soaked with said sodium fluorophosphate.

16. A method as defined in claim 15, wherein the immersion is obtained by placing a dike around said concrete.

17. A method as defined in claim 1, wherein said concrete is immersed in said sodium fluorophosphate.

18. A method as defined in claim 1, wherein said concrete is powdered with said sodium fluorophosphate.

19. A method as defined in claim 1, wherein said system includes a deicer.

20. A method as defined in claim 1, wherein said system includes sodium chloride.

21. A concrete containing sodium fluorophosphate sealing pores in the surface of said concrete.

* * * * *